US011410162B2

(12) United States Patent
Bell et al.

(10) Patent No.: US 11,410,162 B2
(45) Date of Patent: Aug. 9, 2022

(54) ANONYMOUS DISTRIBUTED CONSENSUS REGARDING THE VERIFICATION OF PROTOCOLS

(71) Applicant: Deixis, PBC, Seattle, WA (US)

(72) Inventors: Pamela E. Bell, Lake Oswego, OR (US); Allen L. Brown, Lake Oswego, OR (US); David B. Ezell, Tampa, FL (US); Patrick J. D. Santos, Redmond, WA (US)

(73) Assignee: Deixis, PBC, Seattle, WA (US)

( * ) Notice: Subject to any disclaimer, the term of this patent is extended or adjusted under 35 U.S.C. 154(b) by 152 days.

(21) Appl. No.: 16/526,872

(22) Filed: Jul. 30, 2019

(65) Prior Publication Data

US 2020/0042991 A1 Feb. 6, 2020

Related U.S. Application Data

(60) Provisional application No. 62/879,991, filed on Jul. 29, 2019, provisional application No. 62/712,768, (Continued)

(51) Int. Cl.
*G06Q 20/36* (2012.01)
*G06Q 20/38* (2012.01)
*G06Q 20/06* (2012.01)

(52) U.S. Cl.
CPC ..... *G06Q 20/3674* (2013.01); *G06Q 20/0658* (2013.01); *G06Q 20/388* (2013.01); *G06Q 20/3821* (2013.01)

(58) Field of Classification Search
CPC ........... G06Q 20/3674; G06Q 20/3821; G06Q 20/388; G06Q 20/0658
See application file for complete search history.

(56) References Cited

U.S. PATENT DOCUMENTS

2007/0288250 A1* 12/2007 Lemcke ............... G06Q 10/103
705/300
2013/0110576 A1* 5/2013 Roy ....................... G06Q 10/06
705/7.26

(Continued)

FOREIGN PATENT DOCUMENTS

KR 20040055514 A 6/2004
KR 20180074655 A 7/2018
WO 2017148527 A1 9/2017

OTHER PUBLICATIONS

Singer et al., An Ontological Analysis of Business Process Modeling and Execution, Apr. 18, 2019, https://arxiv.org/pdf/1905.00499.pdf (Year: 2019).*

(Continued)

*Primary Examiner* — Zeshan Qayyum
*Assistant Examiner* — Yingying Zhou
(74) *Attorney, Agent, or Firm* — Han Santos, PLLC (57) ABSTRACT

Techniques to perform mathematically and logically rigorous validations for decentralized applications (DApp) communicatively coupled to a distributed ledger are disclosed. A protocol for a business or enterprise process is encoded as a workflow on a labeled transition system as part of a DApp. Transitions are coded via an asynchronous Pi Calculus or other process calculi. A rules engine validates transitions using process calculi operations, or alternatively performing mathematical and logical analyses on the labeled transition system. Validations are disclosed for both development time and run time. In some embodiments, the logic behind the DApp is composed of a predetermined set of components representing processes. In one specific embodiment, the predetermined set of components is solely of an input component and an output component when composed perform a transaction where either both components received (Continued)

artifact representations from the other component or neither do.

20 Claims, 6 Drawing Sheets

Related U.S. Application Data filed on Jul. 31, 2018, provisional application No. 62/712,792, filed on Jul. 31, 2018.

(56) References Cited

U.S. PATENT DOCUMENTS

| | | | |
|---|---|---|---|
| 2014/0229345 | A1 | 8/2014 | Greef et al. |
| 2015/0379510 | A1* | 12/2015 | Smith ................ G06Q 20/3829 705/71 |
| 2017/0011460 | A1 | 1/2017 | Molinari et al. |
| 2017/0352031 | A1* | 12/2017 | Collin .................... G06Q 30/06 |
| 2018/0218176 | A1* | 8/2018 | Voorhees .............. H04L 9/3213 |
| 2020/0042991 | A1 | 2/2020 | Brown, Jr. et al. |
| 2020/0389301 | A1* | 12/2020 | Detres ................... H04L 9/0861 |

OTHER PUBLICATIONS

Suvorov et al., Smart Contract Design Meets State Machine Synthesis: Case Studies, Jun. 7, 2019, https://arxiv.org/pdf/1906.02906v1.pdf (Year: 2019).*
Cai et al., Decentralized Applications: The Blockchain-Empowered Software System, Sep. 17, 2018, IEEE Access (Year: 2018).*
Li et al., Saclable and Privacy-preserving Design of On/Off-chain Smart Contracts, Apr. 1, 2019, IEEE 35th International Conference on Data Engineering Workshops (ICDEW) pp. 7-12 (Year: 2019).*
Vitalik Buterin, Ethereum White Paper: A Next Generation Smart Contract & Decentralized Application Platform, 2013, https://ethereum.org/en/whitepaper/ (Year: 2013).*
"Baggage Tracking IATA Resolution 753/A4A Resolution 30.53", Implementation Guide, Issue 3.0, Nov. 13, 2017.
"View on 5G Architecture" 5G PPP Architecture Working Group, Version 3.0, Jun. 2019.
Aceto et al.; "Structural Operational Semantics", 2001.
Androulaki et al. "Hyperledger Fabric: A Distributed Operating System for Permissioned Blockchains", Apr. 2018.
Benthem, Johan van. "Modal Logic for Open Minds", Feb. 2, 2010.
Boochi et al., "A Process Calculus of Atomic Commit", 2004.
Brown, Jr., Allen L. "Cones, Co-Cones and Causality—A Categorical Reconstruction of Digital Contracts", Jun. 1, 2020.
Brown, Jr . . . Allen L., et al.;"Exploiting the Normative Aspect of Preference: A Deontic Logic without Actions" 1993.
Giancarlo et al. , 'Validation of Decentralised Smart Contracts Through 1-15 Game Theory and Formal Methods'. Programming Languages with Applications to Biology and Security, Nov. 20, 2015. pp. 142-161 See pp. 142-143 ,149-150.154.156 and figure I.
Goguen et al. "Institutions: Abstract Model Theory for Specification and Programming", Jan. 1992.
Haleplidis et al., 'Towards a network abstraction model for SDN', In: Journal of Network & Systems Management (2015), vol. 23, Issue 2, pp. 309-327, Jul. 1, 2014.
Hardel et al., "Dynamic Logic", Sep. 2000.
International Patent Application No. PCT/US2019/044539, International Search Report and Written Opinion dated Nov. 20, 2021, 11 pages.
International Patent Application No. PCT/US2021/021236, International Search Report and Written Opinion dated Jun. 28, 2021, 12 pages.
Leinster, Tom. "Basic Category Theory", 2014.
Lumpe, Marcus "A :[pi]-Calculus Based Approach for Software Composition", 8-15 University of Bern, Institute of Computer Science and Applied Mathematics , 1999.
Marques et al., 'Constrained Route Distribution for Border GatewayProtocol/MultiProtocol Label Switching (BGP/MPLS) Internet Protocol (IP) Virtual Private Networks (VPNs)', In: network working group RFC: 4684, Nov. 2006 pp. 2-4.
Meyer, Roland. "A Theory of Structural Stationarity in the Calculus", Mar. 2009.
Meyer, Roland. "Structural Stationarity in the [pi]-Calculus".
Nestmann, Uwe. "On The Expressive Power of Joint Input", 1998.
Rocco et al. , 'State to Function Labelled Transition Systems: A Uniform Framework for Defining Stochastic Process Calculi', CNR-ISTI Technical Report, May 2011, See pp. 2-3,7-8,28,39.
Patel et al.; "Mobile-Edge Computing", Sep. 2014.
Peters et al. "Synchrony vs Causality in the Asynchronous Pi-Calculus", 2011.
Raynal, Michel. "Communication and Agreement Abstractions for Fault-Tolerant Asynchronous Distributed Systems", 2010.
Raynal, Michel. "Fault-Tolerant Agreement in Synchronous Message-Passing Systems", 2010.
Sangiorgi, Davide. "An Introduction to Bisimulation and Coinduction", Aug. 2012.
Schultz et al.; "Dynamical Systems and Sheaves", Apr. 2019.
Schweiker et al.; "Operadic Analysis of Distributed Systems"; 2015.
Spivak, David I. "Kleisli Database Instances", 2012.
Spivak, David I., "Functorial Data Migration", Feb. 2013.
Spivak, David I., "The Operad of Wiring Diagrams: Formalizing a Graphical Language for Databases, Recursion, and Plug-and-Play Circuits"; May 2013.
Yang et al., 'Integrated Blockchain and Edge Computing Systems: A Survey, Some Research Issues and Challenges', In: IEEE Communications Surveys & Tutorials (vol. 21, Issue: 2, Secondquarter 2019), Jan. 23, 2019 pp. 1508-1527.
European Patent Application No. 19843313.8, Search Report dated Mar. 18, 2022, 12 pages.
Sobocinski et al: "A Well-behaved LTS for the Pi-calculus" Electronic Notes in Theoretical Computer Science, Elsevier, Amsterdam, NL, vol. 192, No. 1, Oct. 25, 2007 (Oct. 25, 2007), pp. 5-11, XP022313396, ISSN: 1571-0661, DOI: 10.1016/J.ENTCS.2007.10.002.
Markus Lumpe, "A π-Calculus Based Approach for Software Composition," Institute of Computer Science and Applied Mathematics, 1999, 194 pgs.
Pawel Sobocinski, "A well-behaved LTS for the Pi-calculus," Electronic Notes in Theoretical Computer Science, Elsevier, Amsterdam, NL, vol. 192, No. 1.25, Oct. 25, 2007, 7pgs.
South Korean Patent Application No. 10-2021-7005836, Office Action dated Jun. 24, 2022, 11 pages.
Sudhir Agarwal, et al., "Semantic Description of Distribution Business Processes," Published in AAAI Spring Symposium: AI, 2008, 11pgs.

* cited by examiner

Figure 6

ANONYMOUS DISTRIBUTED CONSENSUS REGARDING THE VERIFICATION OF PROTOCOLS

CROSS-REFERENCE TO RELATED PATENT APPLICATIONS

This patent application claims priority to U.S. Provisional Patent Application 62/712,768, entitled "Anonymous Distributed Consensus Regarding the Verification of Health Care Protocols," filed on Jul. 31, 2018, U.S. Provisional Patent Application 62/712,792, entitled "Anonymous Distributed Consensus Regarding Contract-Sanctioned Transition Sequences with Semantic Attachments," filed on Jul. 31, 2018, and U.S. Provisional Patent Application 62/879,991, entitled "Symmetric Asset Exchange," filed on Jul. 29, 2019, all of which are hereby incorporated by reference.

BACKGROUND

A business process is generally automated on a computer by being represented as a workflow comprised of states and transitions between those states. The formal business process for a workflow is called a protocol. States represent an instance, and a transition represents the rules where an instance can change its state. An instance of a process and the instance's state is generally stored in a central database. An example process (or transition in workflow parlance) may be a money transfer transaction where there is a payment between two parties, both with a bank account. The paying party will debit their respective account and the payee party will credit their respective account. A central database may be used to store the state of the user instances, in this case the balances of the paying party account and the payee party account. Furthermore, the central may store the state of the transaction by keeping an audit log of the parties making the transaction, the amount transferred, the accounts affected, and a date/time stamp of the transaction.

This state of affairs works very well for the class of software applications where transitions may be verified with rules. In the case of our debit/credit example above, a rule might be that the amount credited should equal the amount debited. Otherwise, either one party loses money, or the accounts reflect more money than the government issued. Since for this workflow, the transition can be independently verified by an automated system with this rule, the system can be open generally to any party with an account and still be expected to work in a robust manner.

Notwithstanding the theory, users prefer to secure their systems. This is generally accomplished with user account security and access control lists and their variants. The point is that just because a system can be open, doesn't mean that users trust the system. Presently, for centralized systems including the example system above with a central database, trust is effected with cryptographic methods.

However, what happens with the class of applications where the parties distrust each other to the point that they don't trust each other's systems? Consider a party that orders a widget from a website that accepts the party's payment. The widget doesn't arrive. The party contacts the website business owner who assures the party that the widget has been shipped. Indeed, the website itself reflects that state of affairs. At some point, the party may think the website is wrong, or worse that the business owner is fraudulent.

Distributed ledger technology (DLT), including blockchain technology, addresses this problem. DLT provides a decentralized and distributed platform for software applications that is immutable and supports consensus and transparency. Parsing this description, a workflow's state is stored in a ledger that can be stored on a relatively large set of third parties called verifiers. Each verifier has its own redundant copy of the signatures of the states stored on the ledger. Hence the ledger is both distributed since it resides on multiple machines, and decentralized since no one party owns the ledger.

The ledger is also configured to be immutable, that is once a change is made, it cannot be undone. This is because any undo would have to be propagated to all the ledgers. Instead, if an undo has to be done, a reverse operation is propagated to all the ledgers—but the initial action is never deleted. Immutability also supports the notion of transparency; specifically, all actions performed on a ledger can be independently inspected. Indeed, sometimes transparency for DLT is referred to as "radical transparency." This transparency enables independent verification by an arbitrary party, thereby increasing trust in the ledger.

Finally, the ledger is configured to support consensus. Specifically, if you ask one instance of a ledger a question, it will give the same answer as any other instance of the ledger. When you ask a central database a question, it returns the same answer because there is only one store. However, with DLT, there are multiple redundant ledgers, so the ledgers must be kept consistent with each other as to appear to be like a central database. When this consistency is achieved, the ledgers are described as having consensus.

Thus far, DLTs such as blockchains, all have the attributes of being decentralized, distributed, immutable and supporting consensus and transparency. DLTs engender trust. In the case of our widget buying party, if the state of the shipment of the widget were stored on a DLT, the widget buying party would be assured that the website business owner wasn't presenting fraudulent data. Indeed, the DLT could act as a sort of representational escrow—an application could be created where a payment is not finalized without notification that the widget had been shipped, or better yet, received. Throughout the workflow, both the buyer and the seller, and indeed any party, including third parties such as law enforcement would be able to see the progress as well.

Such DLT based applications are often called "DApps" a contraction of "Decentralized Applications." DApps lower transactional costs because they lower the risk of reliance on non-performance by parties.

All this begs the question as to whether the DLT itself has been programmed correctly. Because for DApps, the DLT represents the true state of the affairs, it is particularly important to ensure that the DLT itself is correct.

BRIEF DESCRIPTION OF THE DRAWINGS

The Detailed Description is set forth with reference to the accompanying figures.

DETAILED DESCRIPTION

Mathematical and Logical Foundations of Protocol Verification Via Anonymous Distributed Consensus Prior to describing embodiments of protocol verification via anonymous distributed consensus, it is useful to discuss some underlying techniques. These techniques are described in greater detail as in the papers, "Anonymous Distributed Consensus Regarding the Verified Execution of Health Care Protocols", "Anonymous Distributed Consensus Regarding Contract Sanctioned Transition Sequences with Semantic Attachments", "Symmetric Asset Exchange: A Universal Construction in Contract Patterns for Payments and Logistics", and "Cones, Co-Cones and Causality: A Categorical Reconstruction of Digital Contracts" all of which are included in provisional patents that this application claims priority to and all of which are incorporated by reference in the Related Application section herein. Notwithstanding the incorporation by reference, some outline of these techniques are in order.

1. Labeled Transition Systems+Distributed Ledger Technology+Formal Methods=Rigorous Verification Automated computing systems perform the instructions they are programmed with. If a program comprising computer instructions is correct, the computing system performs correctly. In other words, the computer system performs the tasks that the programmer intended, in the way the programmer intended. This is called semantic correctness. If the program is not correct, the computing system performs incorrectly, thereby creating semantic errors. Since computing systems are programmed by humans, it is inevitable that errors enter computing systems.

To minimize the entrance of errors, there is a body of study known as "formal methods." Specifically, programs are set forth in a representation, often in a language that supports formal methods, i.e. mathematical and logical operations. Because the programs are set forth in a representation that supports formal methods, the programs can use mathematical and logical operations to prove that the program is correct. Indeed, programs can be written to verify the correctness of other programs using mathematical and logical operations. In addition to verification, programs can be written to transform representations into other representations, i.e. translated into other programming languages. The translations may be trusted since mathematical and logical operations supported by the representation provide a rigorous means to specify the operations comprising the translation.

In short, a rigorous representation, and a use of a language that supports formal methods, provides the means to specify, verify and transform programs built on DLT with mathematical and logical rigor.

Accordingly, we start with a protocol, that is a set of interacting actors and resources. The concept underlying a business and enterprise process is typically referred to as a protocol. Where the protocol is represented for automation, the representation is referred to as a workflow, or "the workflow for the protocol." Where a protocol is to be enforced via computer operation, the automated workflow for the protocol is referred to as a "smart contract." The underlying protocols for smart contracts may be captured graphically in the form of network or "swim lane" diagrams or state transition diagrams. The underlying protocols for smart contracts have been represented in languages such as Business Process Execution Language (BPEL) and Microsoft's XLANG. Operation of tools to capture this information is described in further detail with respect to FIGS. 3 and 4.

Once a protocol for a smart contract is identified for automation, the protocol workflow is to be captured in some automatable structure. One automatable structure is a Labeled Transition System (LTS). An LTS is a directed graph (digraph) comprised of nodes representing states, and directed edges representing valid transitions between the states. An actor progresses through the protocol by transitioning between state to state via the edges.

As previously mentioned, users assume that an automated system is correct, i.e. does not have semantic errors. If semantic errors are discovered, the users will not trust the system and will not use it. Accordingly, some means to verify transitions is in order.

Blockchains and DLT in general provide a means of providing anonymous consensus. Specifically, verifiers, usually anonymous third parties are able to review operations, in this case transitions in the LTS, and if the transition is verified, permitting the transition to be posted to the distributed ledger.

Note that it is not necessary for a verifier to be anonymous. Generally, anonymity is a feature of open permissionless systems where anyone can be a verifier. However, in some embodiments, such as permissioned systems where participation is restricted to a known set of participants there may not be a need for anonymity.

One reason to use permissioned systems is to avoid the use of cryptocurrency. In the case of permissionless systems, verifiers participate in verifying DLT transactions because they receive remuneration in the form of a cryptocurrency. Where a business model has substantial reliance on cryptocurrency economics, permissionless systems where participants are maximized is useful. Where a business model does not have substantial reliance on cryptocurrency economics, permissioned systems may make more sense.

But again, regardless if a verifier is anonymous or not, this begs the question of how verifiers can verify transitions in a way that can be trusted.

The proposed solution is to specify transitions with a language that supports formal methods, i.e. mathematical and logical operations. Insofar as mathematical and logical techniques are trusted, so too is a verification based on mathematical and logical techniques. Furthermore, mathematical and logical techniques lend themselves to automation as well. In general, we have the benefit of formal methods to program assertions and validity.

One example of a language supporting formal methods is a process calculus. The Asynchronous Pi (aPi) Calculus is an example of process calculi. Process calculi can be used to encode an LTS and the transitions in an LTS. Process calculi describe communications channels and ports and provide the means of expressing messages. Process calculi provide congruence rules to show mathematical equivalence and reduction rules to transform expressions. Accordingly, process calculi support mathematical and logical operations (such as Hennessy-Milner logics) for mathematical proofs for verification, i.e. mathematically and logically showing that the software performs semantically as expected. The aPi variant lends itself to distributed systems.

As a side note, Hennessy-Milner logics are not the only kinds of logic that may be applied. Preference logics and modal logics may be applied as well. Application of preference logic is described in more detail in the paper, "Anonymous Distributed Consensus Regarding Contract Sanctioned Transition Sequences with Semantic Attachments" included in the provisional patents set forth in the Related Applications section and thereby incorporated by reference herein.

Validation of a protocol and/or workflow of a protocol need not be limited to formal language expressions. When a representation of a protocol/workflow is in a structure that lends itself to mathematical and logical analysis, that mathematical and logical apparatus may be brought to bear in the interests of verifying and translating the protocol/workflow. For example, LTS structures support bisimulation and coinduction, techniques to study the bigraph of a workflow LTS, as part of verification.

As a side note, transitions from in the LTS are coded in aPi or another process calculus. In the name of radical transparency, the LTS may support introspection which is the attribute of showing (also known as reflecting) information about the object being introspected. In some embodiments, the logic to verify a transition or to perform any verification may be shown to a user on demand, thereby providing transparency not on whether a transition was validated, but the logic applied.

2. Symmetric Asset Exchange

In the case of legal contracts, where one party exchanges an asset (such as a good or service) represented by an artifact for another artifact from a second party, confirming performance or receipt of consideration is key to determining substantive breach. With the use of DLT, it is preferable for a party to ensure performance or consideration of the other party prior to the first party's performance or consideration. In this way, the risk of certain classes of damages, such as reliance damages is virtually eliminated.

With the LTS+DLT+aPi configuration, protocols can be decomposed into binary exchanges where in a binary exchange, either both parties receive the other's artifacts or both don't. There is no attempted exchange where one party receive an artifact and the other doesn't. Since the results of the exchange are the same for both parties, this exchange is symmetric. Since the exchange is of artifacts representing assets, this (sub)protocol is called symmetric asset exchange (SAX).

A specific decomposition can be of an input component, potentially representing a first process, and an output component, potentially representing a second process. These two components are atomic components that may be composed into larger protocols. In this embodiment, the input component is configured to logically determine either that a message has been received at a first channel and thereafter binds the message to a variable of the first channel, or that the message has been received at a second channel and thereafter binds the message to a variable of the second channel. In turn, the output component is configured to receive a message comprised of two components, and upon receipt of the message, to send the first component on a first channel and to send the second component on a second channel. A composition of the two results in the first process receiving an artifact from the second process and the second process receiving an artifact from the first process, or both processes not receiving an artifact. In this configuration, the input and output components satisfy symmetric assets exchange.

In some embodiments, the components may be configured as not to share any free names or free variables except for a name of a channel to signify completion of a process (known as "done"). In some embodiment, the done process may be used to synchronize the operation of the distributed components, similar in operation to a critical section or a mutual exclusion (mutex).

One of the advantages of making use of the asynchronous Pi Calculus (aPi), is that it lends itself to composability. Therefore, one can specify a protocol in terms of subprotocols and the subprotocols may be represented using aPi. The specific internals of the input and output components is described in further detail in the paper, "Symmetric Asset Exchange: A Universal Construction in Contract Patterns for Payments and Logistics" included in the provisional patents set forth in the Related Applications section and thereby incorporated by reference herein.

It is to be noted that the more processing a DApp performs on a DLT, especially for permissionless applications, the more expensive the DApp is to operate. In general, cryptocurrency processing costs are proportional to the amount of processing performed. For this reason, symmetric exchange and validations may be performed in a validator application that is not hosted on a DLT runtime thereby offloading processing off the DLT. A validator application calls the DLT typically only to post persistence, usually via a DApp. In this way, a non-DLT app, here the validator application divides work with a DApp in order to minimize cryptocurrency costs and DLT runtime load.

3. Category Theory View

DLTs are not necessarily configured to store the state of a transition. Rather DLT's store Merkle tree hashes representing the signature of a transition. Since the hashes are based on the cryptographic keys of the parties performing the transitions as well as past hashes, the DLT is compact while enabling parties to determine whether a transition is legitimate. For the actual state of the transition, a party might access a traditional centralized database.

Leveraging centralized databases may lower the friction of making use of DLT. Since in this scenario DLT is augmenting existing infrastructure rather than replacing it, risks of porting the existing infrastructure are minimized.

However, it may be desirable to capture the schema of a traditional central database and determine whether a transformation preserves semantics. In some embodiments, categorical databases are used as a sort of neutral *lingua* franca to identify semantic preserving transformation. Categorical databases are databases that make use of mathematical category theory which enables a user to identify equivalent and congruent database schemas. In short, a smart contract may be characterized as a semantic preserving transformation of a categorical database.

Internals of how to use category theory in this context is described in further detail in the paper, "Anonymous Distributed Consensus Regarding Contract Sanctioned Transition Sequences with Semantic Attachments" included in the provisional patents set forth in the Related Applications section and thereby incorporated by reference herein.

Accordingly, we have access to the additional apparatus made available from category theory to bring to bear. In this way, the LTS+DLT+aPi configuration allows users to apply computational, categorical and logical techniques at will.

Context of Protocol Verification Via Anonymous Distributed Consensus

Figure 1:
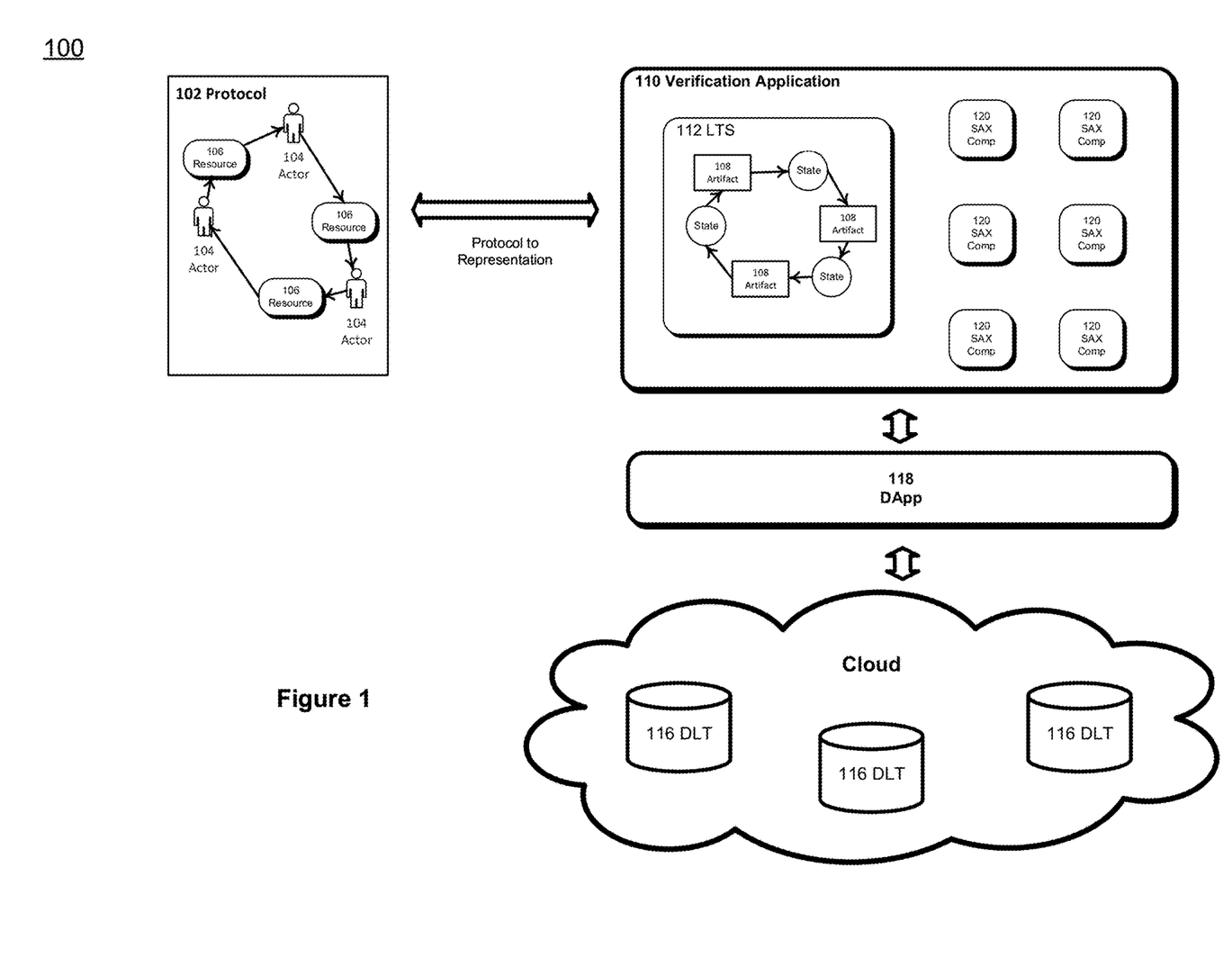
FIG. 1 is a top-level context diagram for protocol verification via anonymous distributed consensus.

We are now ready to describe the context for protocol verification of anonymous distributed consensus. FIG. 1 is a context diagram 100 for protocol verification via anonymous distributed consensus. A protocol 102 is a business or enterprise process comprised of a set of actors 104 and resources 106 that interact. The actors may be humans or may be automated processes themselves. Resources represent some sort of asset that may be exchanged (goods) or some sort of asset that is transformed in performance of a contract (services). The assets may be represented electronically with some sort of token known as an artifact 108. The logic behind a protocol is known as a "workflow" or a "workflow of the protocol."

The workflow may be encoded in a verification application 110 comprised of an LTS 112 where transitions are associated with verification rules 114 in a formal language such as aPi.

Persistence of successful transitions are on a distributed ledger 116 via a decentralized application (DApp) 118 performs and stores verification logic. The verification application 110 may be comprised of atomic symmetric asset exchange components 120 communicatively coupled to the DLT corresponding to transitions.

Figure 3:
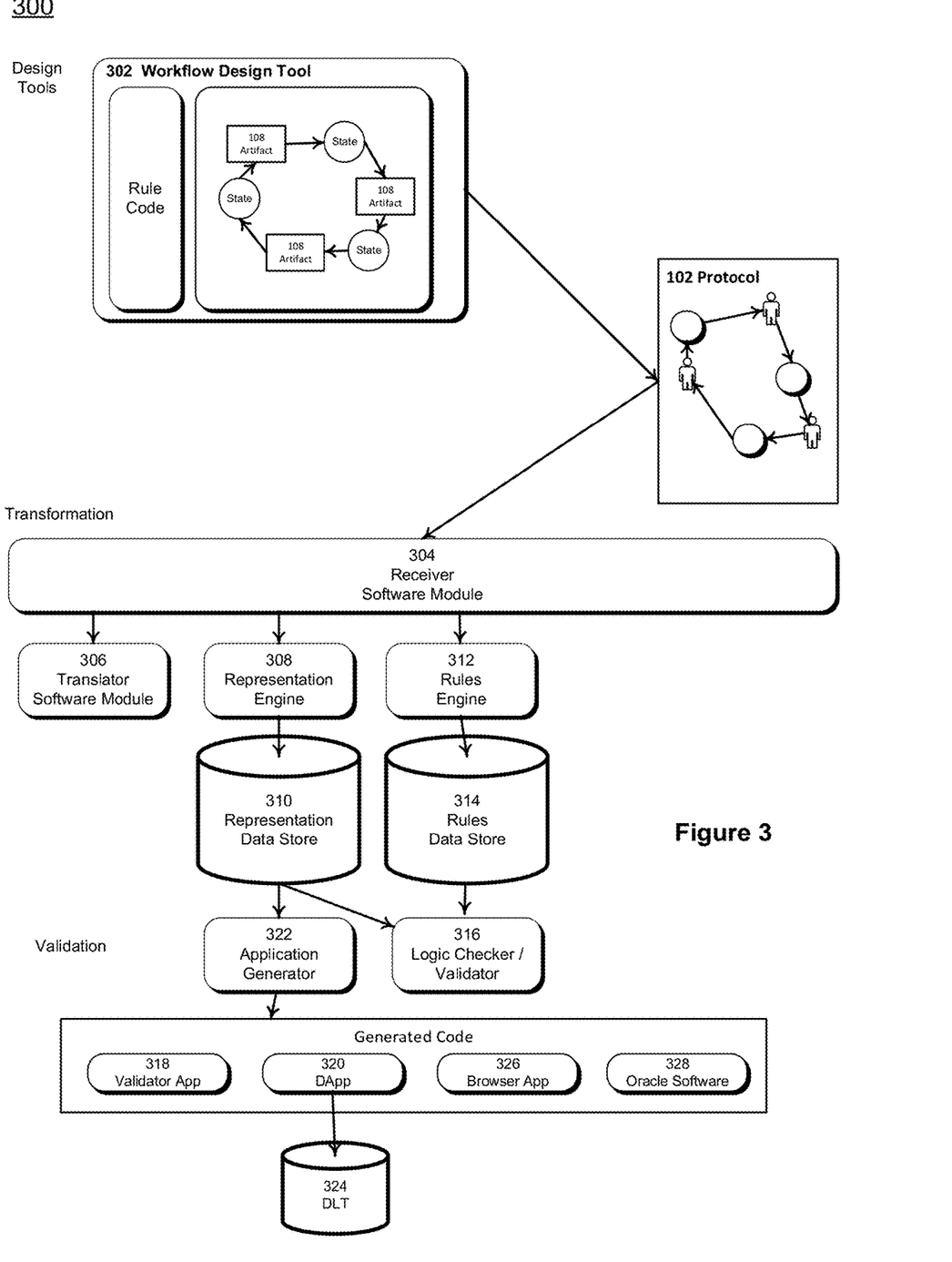
FIG. 3 is a block diagram of an exemplary architecture for a decentralized application development environment with protocol verification via anonymous distributed consensus.
Figure 4:
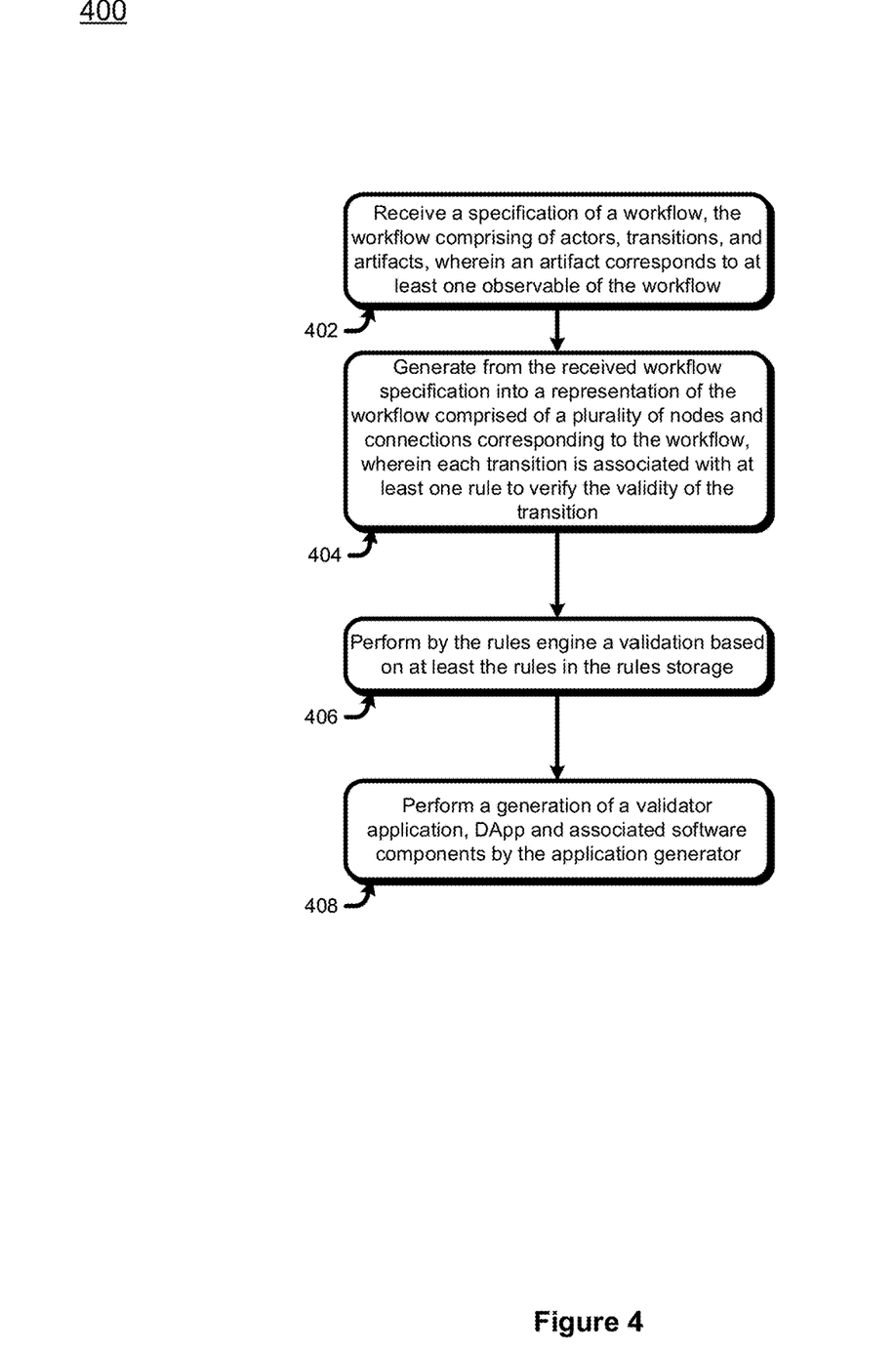
FIG. 4 is a flow chart for an exemplary decentralized development process with protocol verification via anonymous distributed consensus.

The development time operation is described in further detail with respect to FIGS. 3 and 4. The run time operation is described in further detail with respect to FIGS. 5 and 6.

Figure 2:
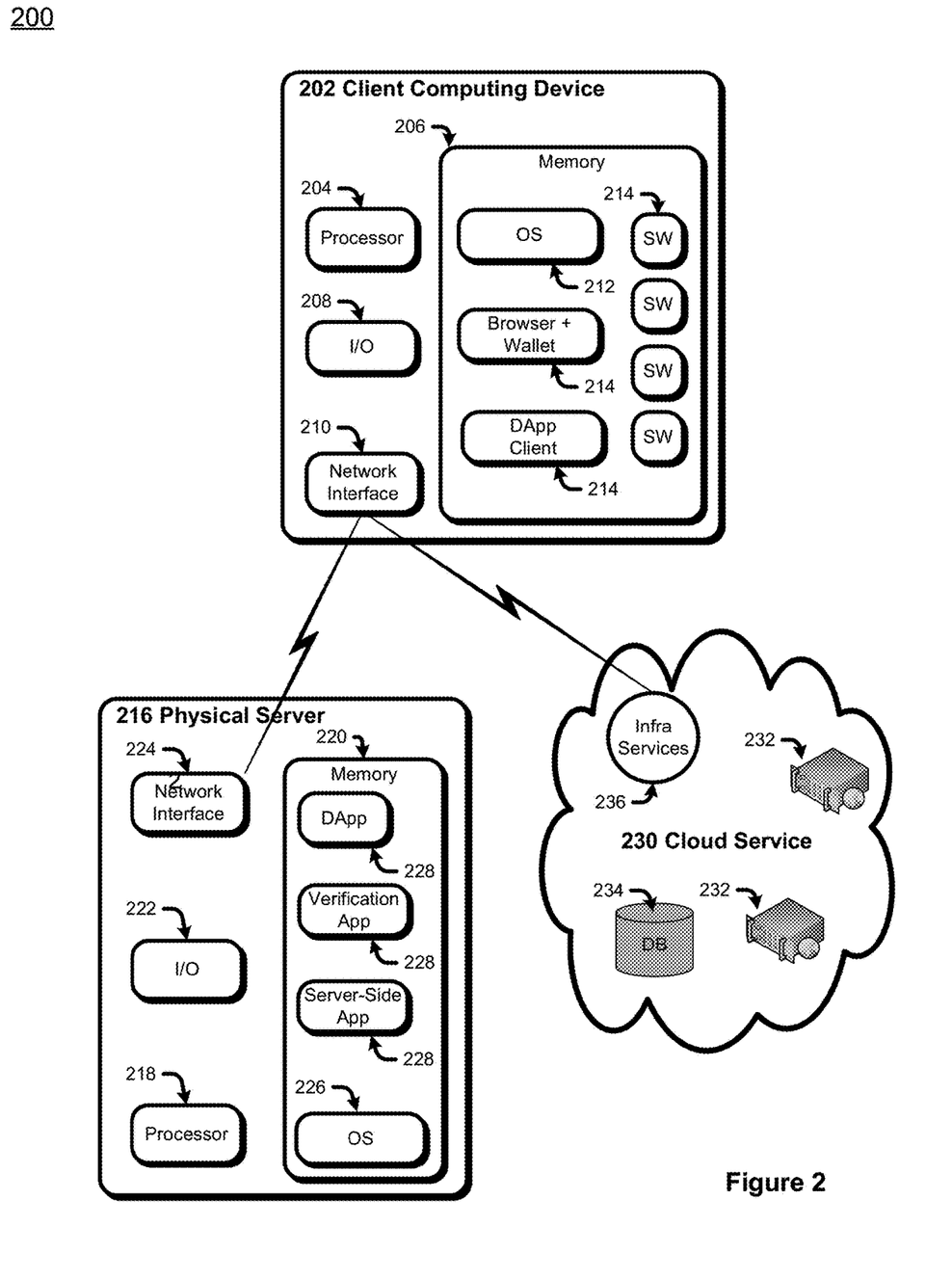
FIG. 2 is a diagram of an exemplary hardware, software and communications environment for protocol verification via anonymous distributed consensus.

Exemplary Environment for Protocol Verification Via Anonymous Distributed Consensus Protocol verification via anonymous distributed consensus is generally performed on computing devices comprised of hardware, software and communications infrastructure. FIG. 2 is an exemplary environment diagram 200 describing the hardware, software and communications environment for protocol verification via anonymous distributed consensus.

Client-side software, such as web browsers, client cryptographic wallets and DApp clients are generally hosted on a client computing device 202. Exemplary client computing devices 202 include without limitation personal computers, laptops, embedded devices, tablet computers, and smart phones. Since these client computing devices 202 are to access decentralized applications, these client computing devices 202 are networked.

The client computing device 202 has a processor 204 and a memory 206. The processor may be a central processing unit, an application processing unit, and/or a dedicated controller such as a microcontroller.

The client computing device 202 further includes an input/output (I/O) interface 208, and/or a network interface 210. The I/O interface 208 may be any controller card, such as a universal asynchronous receiver/transmitter (UART) used in conjunction with a standard I/O interface protocol such as RS-232 and/or Universal Serial Bus (USB). The network interface 210, may potentially work in concert with the I/O interface 208 and may be a network interface card supporting Ethernet and/or Wi-Fi and/or any number of other physical and/or datalink protocols. On many client computing devices 202, such as with smart phones, the client computing device 202 is able to participate in both cellular and unlicensed wireless communications (e.g. Wi-Fi). Accordingly, in a smart phone/mobile embodiment, the network interface 210 may work in concert with one or more radios for cellular or unlicensed communications.

Note that in general, memory 206 is any computer-readable media which may store several software components including an operating system 218 and software components and client-side software 214. In general, a software component is a set of computer-executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. As defined herein, computer storage media does not include communication media.

Server-side applications such as verification applications 110 and DApps 118 are generally hosted on a physical server, or on a virtual machine. Where the server-side applications 110, 118 are hosted on a physical server, the server 216 is any computing device that may participate in a network. The network may be, without limitation, a local area network ("LAN"), a virtual private network ("VPN"), a cellular network, or the Internet. The server 216 may be a computing device with sufficient I/O computing capacity to serve multiple clients. Specifically, the physical server 216 includes a processor 218, a memory 220, an input/output interface 222 and a network interface 224. In the memory 220 will be an operating system 226 and server-side applications 228.

Alternatively, the server-side applications 228 may be hosted on a virtual machine via a cloud service 230. Specifically, the cloud service 230 may represent a plurality of disaggregated servers which provide virtual application server 232 functionality and virtual storage/database 234 functionality. The disaggregated servers are physical computer servers, which may have a processor, a memory, an I/O interface and/or a network interface. The features and variations of the processor, the memory, the I/O interface and the network interface are substantially similar to those described for the physical server 216. There may be differences where the disaggregated servers are optimized for throughput and/or for disaggregation. In addition to hosting the server-side applications 228, machine learning/cognitive network software (not shown) and other server-side software (not shown) may be hosted on virtual application servers 232.

The cloud service 230 may be made accessible via an integrated cloud infrastructure 236. Cloud infrastructure 236 not only provides access to cloud services 230 but also to billing services and other monetization services. Cloud infrastructure 236 may provide additional service abstractions such as Platform as a Service ("PAAS"), Infrastructure as a Service ("IAAS"), and Software as a Service ("SAAS").

Exemplary Development Environment for Protocol Verification Via Anonymous Distributed Consensus LTS+DLT+aPi is configured to perform protocol verification via anonymous distributed consensus. Key applications are divided into development time applications and run time applications. Development time applications are described in the context of FIG. 3, a block diagram 300 of an exemplary development environment for protocol verification via anonymous distributed consensus and FIG. 4, a flow chart of the operation of the same. Run time applications are described in more detail with respect to FIGS. 5 and 6.

In FIG. 3, operation begins with a workflow design tool 302. The workflow design tool may receive specifications of actors and resources interacting. The specification may be of actors, states, transitions between the states, and of artifacts representing resources as assets to be exchanged. While the output of the workflow design tool 302 is a specification of a protocol of a business or enterprise process, the workflow design tool 302 may be a graphical tool which receives as input the drawing of a network (swimlane) diagram or in the alternative a drawing of a state machine.

In the case of the network diagram, individual swimlanes correspond to actors. Arrows between swimlanes indicate interactions between actors and may be associated with artifacts or functions performed during the interactions. Note that in the network diagram, flow does not necessarily represent state transitions since flow is between actors rather than states.

In the cases of a state transition diagram, nodes may represent states, arrows between states may represent transitions between states. Transitions again here may be associated with artifacts or functions performed during the interactions.

Graphical representations may be converted by the workflow design tool 302 into textual form, for example in BPEL or XLANG. Alternatively, BPEL or XLANG may be hand edited with a text editor.

Turning to FIG. 4, processing starts by a when a receiver module 304 receives a protocol based on a drawing of a protocol 402, or from a textual protocol specification, edited with workflow design tool 302. In particular, turning back to FIG. 3, the receiver module 304 parses the input specification, looks for syntax and other errors, and stores the parsed input specification into an intermediate representation format suitable for rules checking. The representation is stored by a representation engine 308 in a representation data store 310. Rules are predetermined and are managed by the rules engine 312 and stored in rules data store 314.

In some embodiments, the intermediate representation format of the protocol is a virtual version of an LTS with associated transition rules stored in the rules data store 314 and accessible by the rules engine 312. Rules may be reviewed from the workflow design tool 302 by selected transitions which reflect back the rules.

Both static and dynamic tests may be performed. Static tests such as completeness checks, logic checks and bisimulations may be performed by a logic checker/validator 316.

For dynamic testing, a validator application 320 a simulated application comprising a validator application 318 and a DApp 320 may be generated by an application generator 322. The generated application may be configured to be communicatively coupled with a test or even production distributed ledger 324. For input triggers, the application generator may also generated browser applications 326 and/or oracles 328 (which among other things provide representations of external state to distributed ledgers).

Once the application has been generated, test inputs may be run to validate the intermediate representation as part of dynamic testing.

Turning back to FIG. 4, in block 406 validations are performed by the logic checker/validator. Checks may be based on rules specific to an application, or may be rules that are to be true of any application. Checks may be of the LTS itself, such as via bisimulation and/or coinduction, or may be of the transition rules themselves e.g. aPi checks.

Note that because the generated application has an intermediate form, testing need not be specific to the LTS and the rules in aPi. For example, categorical database representations may be generated to perform category theory based checks as well.

In block 408, the application generator 322 generates the application components and deploys as described above. The versioning, building, and deploying cycle may be scripted and orchestrated via integration with DevOps software.

In this way mathematical and logical operations are accessible at all steps of the development, testing, build and deployment cycles.

Figure 5:
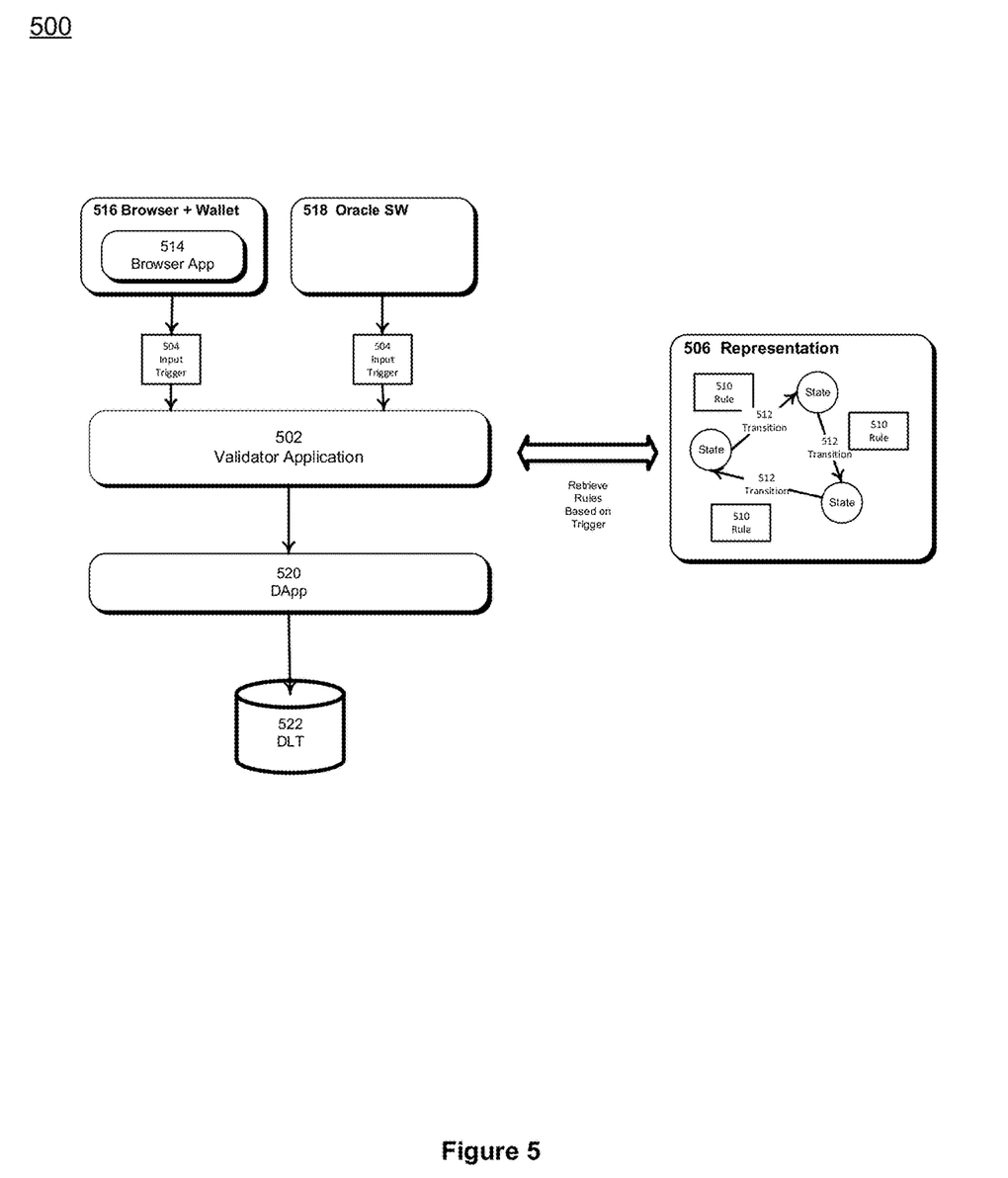
FIG. 5 is a block diagram of an exemplary architecture for a decentralized application operational environment with protocol verification via anonymous distributed consensus.
Figure 6:
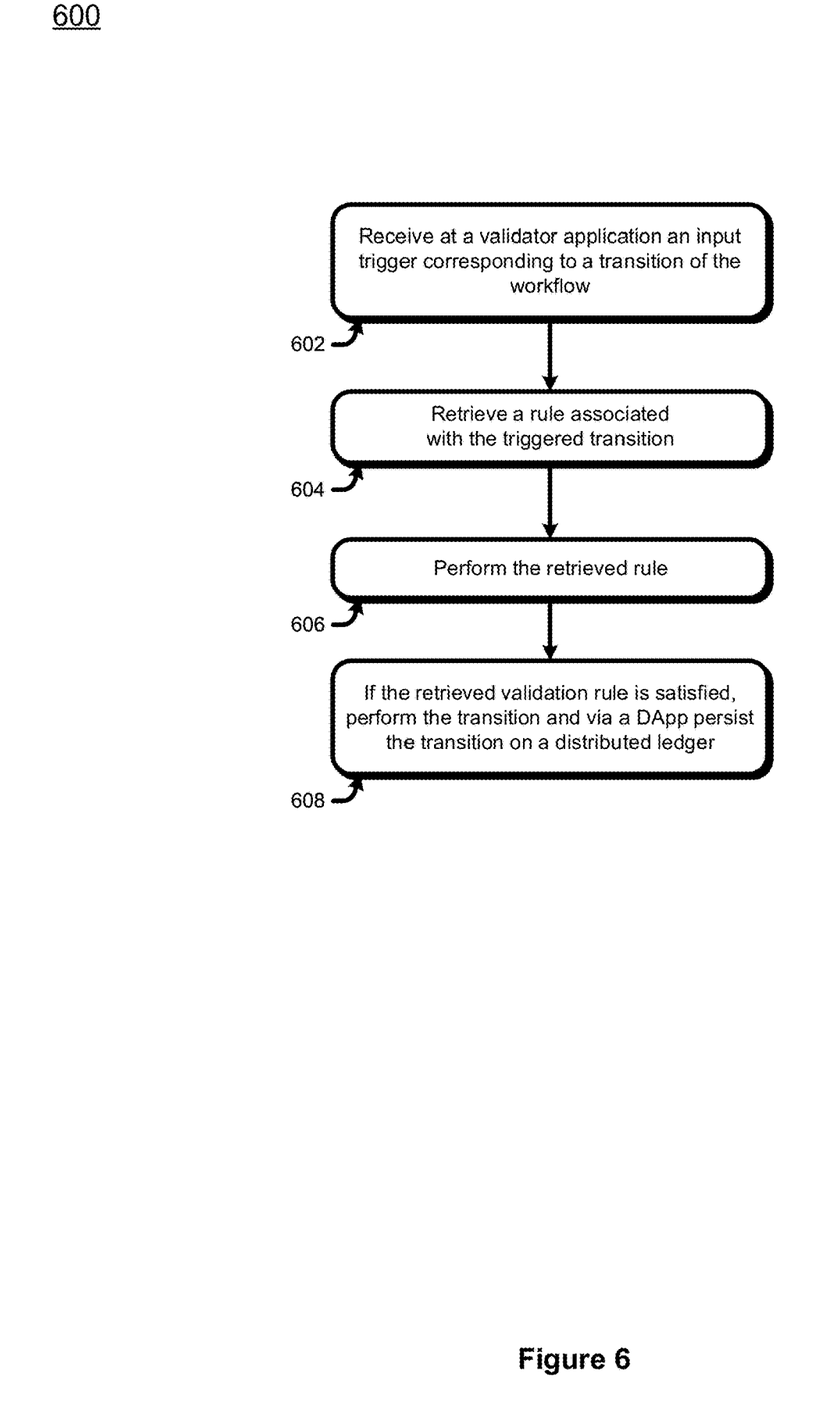
FIG. 6 is a flow chart for an exemplary decentralized operation with protocol verification via anonymous distributed consensus.

Exemplary Run Time Environment and Operation for Protocol Verification Via Anonymous Distributed Consensus FIG. 5 is a block diagram 500 of an exemplary run time environment for protocol verification via anonymous distributed consensus and FIG. 6 is a flow chart 600 of the operation of the same.

As described above, a validator application 502 has been generated by an application generator 322. Unlike the validator application 318 under test, validator application 502 is deployed into production.

The validator application 502 is configured to receive input triggers 504 which are software messages (either via a push communications protocol such as message passing or by a pull communications protocol such software notifications/events).

The validator application 502 includes a representation generally in the form of an LTS with rules 510 associated with transitions 512 in the LTS. In some embodiments, the rules 510 are encoded via aPi. As with the test version in the development environment, the generated application also includes clients such as a browser application 514 running on a web browser 516 optionally configured with a cryptocurrency wallet, oracles 518, and a DApp 520 to perform persistence on a distributed ledger 522.

Turning to FIG. 6, in block 602, the validator application 502 receives an input trigger 504 from a browser application 514 or an oracle 518. In block 604, the validator application 502 then identifies the relevant transition 512 in the protocol, and retrieves the rule 510 associated with the transition 512.

In block 606, the validator application 502 then performs the retrieved rule 510. In block 608, if the rule 510 is satisfied, i.e. the checks specified by the rule 510 are verified, the LTS is updated and the validator application 502 calls the DApp 520 to post the validated transaction to the distributed ledger 522.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to perform workflow transition validations, comprising:
  receiving, at a server, a specification of a workflow, the specification comprising of actors, states, transitions between the states, and artifacts representing resources as assets to be exchanged in the transitions;

generating from a received workflow specification a directed graph (digraph) of the workflow comprised of a plurality of nodes representing the states and directed edges representing the transitions between the states, wherein each of the transitions is associated with at least one rule that includes a symmetric exchanging of the assets to verify the validity of the transitions between the states;

generating, by the server, a validator application and a distributed ledger technology (DLT)-based application (decentralized application), wherein the validator application offloads processing off the decentralized application during a DLT runtime load on the workflow transition validations;

receiving, by the validator application, an input trigger that corresponds to a transition in the digraph;

verifying, by the validator application, the transition in the digraph via the symmetric exchanging of the assets;

updating, by the validator application, the digraph based at least upon a verification of the transition in the digraph;

calling, by the validator application, the decentralized application to store an updated digraph on a distributed ledger; and storing, by the decentralized application, the updated digraph on the distributed ledger.

2. The method of claim 1, wherein the digraph represents a labeled transition system (LTS) structure.

3. The method of claim 2, wherein the LTS structure supports a bisimulation or a coinduction to study the digraph during a verification of the transition in the digraph.

4. The method of claim 1, wherein the transition in the digraph is encoded using a process calculus.

5. The method of claim 4, wherein the process calculus is an asynchronous pi calculus.

6. The method of claim 1, wherein the digraph includes a category theoretical representation of the received specification of the workflow.

7. The method of claim 1, wherein the at least one rule is encoded using a programmable language supporting formal methods.

8. A method to perform workflow transition validations, comprising:

receiving, at a server, a specification of a workflow, the specification comprising of actors, transitions, and artifacts that represent resources as assets to be exchanged in the transitions;

generating from a received workflow specification a labeled transition system (LTS), wherein each of the transitions in the LTS is associated with at least one rule that includes a symmetric exchanging of the assets to verify a validity of the transitions, and wherein a generated LTS is composed of a set of predetermined components communicatively coupled to a distributed ledger, the predetermined components representing processes;

generating, by the server, a validator application and a distributed ledger technology (DLT)-based application (decentralized application), wherein the validator application offloads processing off the decentralized application during a DLT runtime load on the workflow transition validations;

receiving, by the validator application, an input trigger that corresponds to a transition in a generated LTS, performing, by the validator application, a verification of the transition in the LTS via the symmetric changing of the assets;

updating, by the validator application, the LTS based at least upon a verification of the transition in the LTS; and storing, by the decentralized application, an updated LTS on the distributed ledger.

9. The method of claim 8, wherein the predetermined components are atomic components.

10. The method of claim 8 further comprising: calling, by the validator application, the decentralized application to store the updated LTS on the distributed ledger.

11. The method of claim 9, wherein the predetermined components implement symmetrical exchange of artifacts.

12. The method of claim 11, wherein at least one permutation of composing a first component with a second component results in either both components receiving the artifacts from other component, or neither of the components receiving the artifacts from the other component.

13. The method of claim 8, wherein the predetermined components are comprised of either symmetric asset exchange input atomic components, symmetric asset exchange output atomic components, or both.

14. The method of claim 13, wherein the symmetric asset exchange input atomic component logically determines either that a message has been received at a first channel and thereafter binds the message to a variable of the first channel, or that the message has been received at a second channel and thereafter binds the message to a variable of the second channel.

15. The method of claim 14, wherein the symmetric asset exchange output atomic component is configured to receive a message comprised of two components, and upon receipt of the message, to send a first component on a first channel and to send a second component on a second channel.

16. The method of claim 13, wherein at least one permutation of composing a symmetric asset exchange input component with a symmetric asset exchange output component results in either both an input component and an output component receiving artifacts from other component, or neither the input component and the output component receiving artifacts from the other component.

17. A system to automate a workflow, the system comprising:

a processor;

a memory coupled to the processor, the memory includes a plurality of computer-executable components that are executable with the processor to perform a plurality of actions, the plurality of actions comprising:

receiving a specification of a workflow, the specification comprising transitions and artifacts representing resources as assets to be exchanged in the transitions;

generating from a received specification a directed graph (digraph) of the workflow, wherein each of the transitions in the digraph is associated with at least one rule that includes a symmetric exchanging of the assets to verify the validity of the transition;

generating a validator application and a distributed ledger technology (DLT)-based application (decentralized application), wherein the validator application offloads processing off the decentralized application during a DLT runtime load on the workflow transition validations;

receiving an input trigger that corresponds to a transition in the digraph;

verifying the transition in the digraph via the symmetric exchanging of the assets;

updating the digraph;

calling via the validator application the decentralized application to store an updated digraph on a distributed ledger; and storing the updated digraph on the distributed ledger.

18. The system of claim 17, wherein the transition in the digraph is encoded using a process calculus.

19. The system of claim 18, wherein the process calculus is an asynchronous pi calculus.

20. The system of claim 17, wherein the digraph represents a labeled transition system (LTS) structure.

* * * * *